United States Patent [19]

Moisson-Franckhauser

[11] Patent Number: 5,059,936
[45] Date of Patent: Oct. 22, 1991

[54] TOROIDAL HYBRID TRANSFORMER

[75] Inventor: François Moisson-Franckhauser, Bretigny sur Orge, France

[73] Assignee: Alsthom, Paris, France

[21] Appl. No.: 347,619

[22] Filed: May 5, 1989

[30] Foreign Application Priority Data

May 5, 1988 [FR] France ................................ 88 06039

[51] Int. Cl.$^5$ ............................................ H01F 27/08
[52] U.S. Cl. ................................ 336/55; 336/DIG. 1
[58] Field of Search ................. 336/DIG. 1, 228, 229, 336/225, 55; 335/216; 505/867, 868, 869, 870; 323/360; 363/14, 64, 153, 171

[56] References Cited

U.S. PATENT DOCUMENTS

| 3,686,458 | 8/1972 | Denel et al. | 200/262 |
| 3,736,539 | 5/1973 | File et al. | 335/216 |
| 4,032,959 | 6/1977 | Boom et al. | 323/234 |
| 4,779,070 | 10/1988 | Hackworth et al. | 335/296 |

FOREIGN PATENT DOCUMENTS 0074407 4/1985 Japan ............................ 336/DIG. 1

Primary Examiner—Leo P. Picard
Assistant Examiner—Bot Lee Ledynh
Attorney, Agent, or Firm—Sughrue, Mion, Zinn, Macpeak & Seas

[57] ABSTRACT

A toroidal hybrid transformer includes a primary winding (2), which is superconducting in operation and a secondary winding (10) which is non-superconducting, separated by thermal and electrical insulation. A strength member (1) withstanding the centripetal forces exerted on the primary winding supports the primary winding (2) and is disposed inside the conductor turns (20, 21; 26, 27, 28) constituting the primary winding. Anchoring wedges (3, 12) mechanically couple the strength member to at least that portion of each of said conductor turns which is adjacent to the axis of symmetry (14) of the toroidal transformer, thereby transmitting the centripetal forces exerted on the primary winding to the strength member.

7 Claims, 2 Drawing Sheets

TOROIDAL HYBRID TRANSFORMER

The present invention relates to a toroidal hybrid impulse transformer, with said term designating an impulse transformer which is toroidal in shape and in which its primary winding is superconducting in operation, whereas its secondary winding is not superconducting. In order to keep the primary winding in the superconducting state, it must be cooled to a low temperature, whereas the secondary winding may be at ambient temperature.

BACKGROUND OF THE INVENTION

An energy-accumulating device using a transformer of this type is described in French patent application number 88 04672, filed Apr. 8, 1988. The hybrid impulse transformer therein is used for accumulating and storing energy by setting up a current in the inductance constituted by the primary winding, with the secondary winding being open circuit, and by maintaining this current loop in a circuit which is entirely superconducting, i.e. without loss. The energy is stored in the intense magnetic field generated in the transformer by the current. The coupling between the primary winding and the secondary winding enables said energy to be discharged in the form of a pulse in the secondary winding by interrupting the current in the primary after a utilization circuit has been connected to the secondary. The current pulse provided by the secondary winding is used, for example, to launch a projectile, e.g. in a so-called "electromagnetic" launcher.

In order to obtain high efficiency in energy storage, it is necessary for the coupling between the primary winding and the working magnetic field to be without loss. It is known that a toroidal transformer provides the best solution in this respect, particularly since the intensity of the magnetic field is such as to make it impossible to use a field-guiding magnetic circuit made of high permeability material since the material would saturate. In addition, the greater the coupling between the primary winding and the secondary winding, the lower the interrupting power required of the primary circuit. This requirement for close coupling thus assumes that the secondary winding is wound as close as possible to the primary winding.

The electrodynamic forces acting on the conductors of windings tend to increase the diameter of winding turns give rise to a centripetal resultant directed towards the axis of symmetry of the torus. Such a resultant must be withstood by a strength member for each of the windings.

For thermodynamic reasons, it is also desirable to place the secondary winding over the primary winding and not vice versa, with an electrical insulator and a thermal insulator being interposed between the windings.

It might be thought that a single strength member could be placed in the center of the torus, to support the above-mentioned centripetal resultants on both windings. However this is not possible because the resulting centripetal force acting on the primary winding would press the primary winding so hard against the secondary winding and the single strength member as to crush the thermally insulating material.

The object of the invention is thus to provide a toroidal hybrid impulse transformer provided with a strength member suitable for supporting the primary winding against the above-mentioned centripetal forces, while nevertheless allowing the secondary winding to be disposed as close as possible to the primary winding.

SUMMARY OF THE INVENTION

The present invention provides a toroidal hybrid transformer comprising a primary winding which is superconducting in operation, a secondary winding which is non-superconducting, thermal and electrical insulation means, and a strength member for withstanding the centripetal forces exerted on the primary winding, wherein the strength member supporting the primary winding is disposed inside the turns constituting the primary winding and means are provided for mechanically coupling the strength member to at least that portion of each turn which is adjacent to the axis of symmetry of the toroidal transformer, thereby transmitting the centripetal forces exerted on the primary winding to the strength member.

Advantageously, the strength member is constituted by a ring whose outside shape is similar to the toroidal transformer, with the turns of the primary winding being wound around the surface thereof, and with the portion of said ring facing the axis of symmetry of the torus including retention means coupling the strength member to at least a corresponding portion of each turn.

Advantageously, said retention means are constituted by anchoring wedges each comprising: a wedge body provided for insertion in a groove in the strength member in order to be retained therein by shape co-operation; a connection web extending the wedge body towards the axis of symmetry of the torus through the thickness of the primary winding; and at least one support flange extending transversely from said web between the primary winding and said axis of symmetry, thereby receiving the entire centripetal force exerted on the adjacent portion of the winding and transmitting said force to the strength member via web and said wedge body.

Advantageously, said strength member contains a bath of cooling liquid.

Advantageously, cooling liquid ducts are included within the primary winding between said retention means.

Advantageously, the primary winding is covered by layers of electrical and thermal insulation and then directly supports the secondary winding which is itself insulated and covered with binding.

Advantageously, the cooling liquid is caused to flow in a loop along the entire perimeter of each turn, initially in said ducts which are rectilinear, and then along the conductors in the space lying between the cold inner wall of the cryostat and a former on which the transformer is wound.

BRIEF DESCRIPTION OF THE DRAWINGS

An embodiment of the invention is described by way of example with reference to the accompanying drawings, in which.

DETAILED DESCRIPTION

Figure 1:
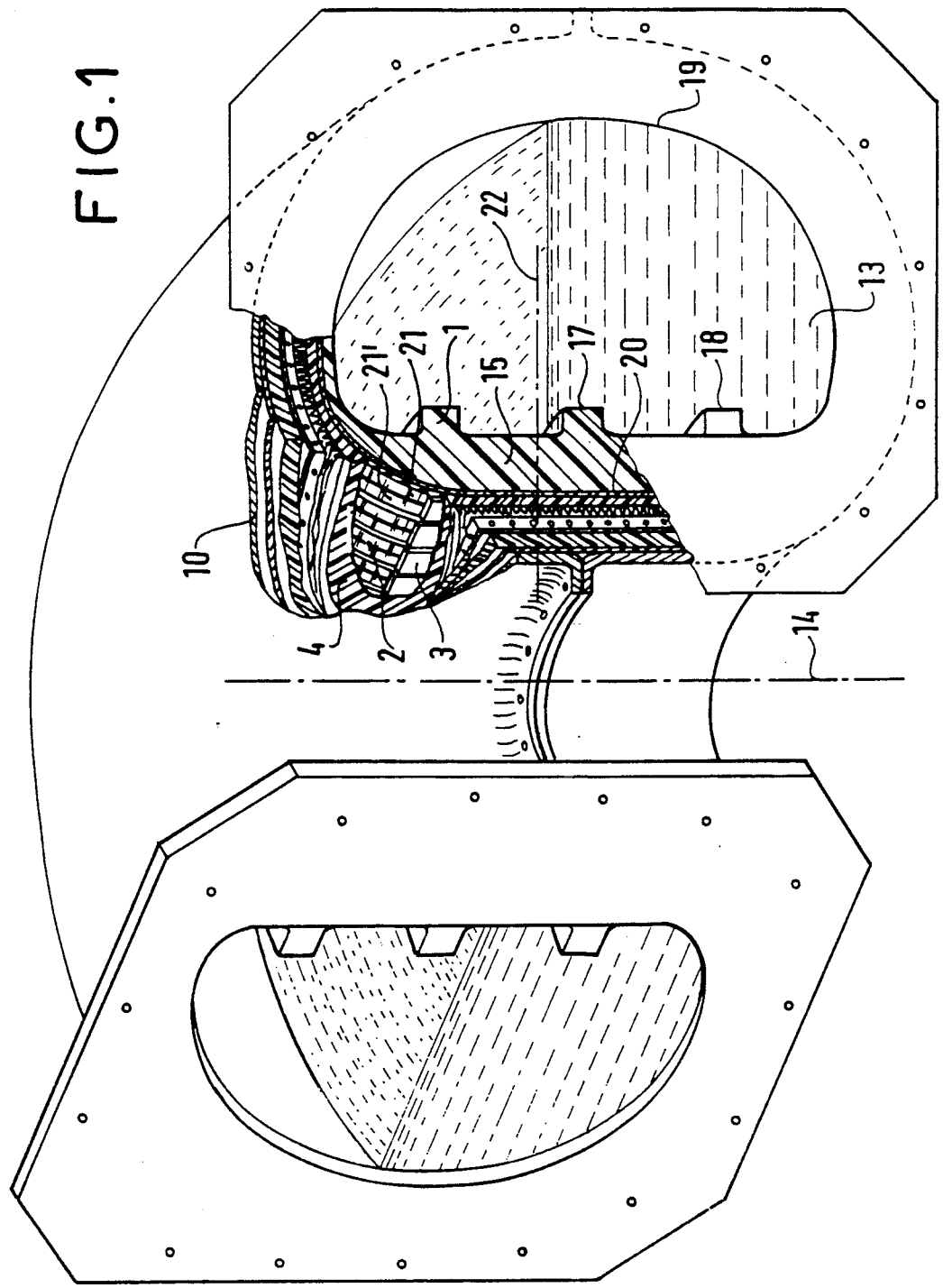
FIG. 1 is a perspective view of a segment of a toroidal hybrid trnsformer of the invention, partially cut-away in order to show up the organization of the various portions of the transformer.

An embodiment of the invention is described, initially with reference to Fig. 1.

FIG. 1 shows a 120° section of a toroidal structure comprising three identical portions which are assembled by means not shown and which together make up a transformer. The transformer thus comprises, going from the inside of the toroidal ring towards its outside, the following (see FIG. 2, in particular):

a toroidal former 1 made of insulating material which is fluid-tight and which contains a cooling fluid;

a primary winding 2 which may comprise a single layer of a conductor whose turns nearly touch one another where they come closest together;

anchoring wedges 3;

an inner wall 4 constituting the cold wall of the cryostat containing the winding 2, said wall being made of an insulating material such as epoxy glass;

an evacuated space 5 containing a cushion of superinsulation;

a heat screen 6 which may be constituted by a discontinuous sheet of tubes having a cooling liquid flowing therethrough;

wedges 7 separating the heat screen from the outer wall of the cryostat;

a fluid-tight wall 8 of electrically non-conductive material and constituting the hot wall of the cryostat;

a thermally insulating layer 9;

a conducting sheet 10 constituting the secondary winding of the transformer; and binding (not shown) including thermal and electrical insulation for the secondary winding.

The primary winding 2 is supported by the former 1. As a former, its presence is not absolutely essential since "air" wound windings exist in which the wire, once put into shape, is strong enough to define and retain the shape of a winding. Along such windings, the ratio between the local radius of curvature to the distance from the axis of the torus remains invariant. However, the transformer contains a cooling liquid, referenced 13. This requires a fluid-tight container, but does not require particularly strong mechanical characteristics. However, according to the invention, former 1 also acts as a strength member for supporting the primary winding 2 against electrodynamic forces, and to this end it needs to have appropriate mechanical strength. These forces tend to increase the cross-sectional area of the winding 2 and they have a centripetal resultant towards the axis of symmetry 14 of the toroidal structure. Thus, in the embodiment shown in FIG. 1, the inside of the former 1, i.e. its portion closest to the axis 14, is of greatly increased thickness at 15, and also includes reinforcing ribs 16, 17, and 18. The centripetal forces transmitted from the winding 2 to this portion 15 of the former 1 which acts as the strength member are withstood without significant deformation by virtue of the fact that this portion 15 is then subjected to uniform radial contraction. The former may be made of a plastic insulating material such as a polyimide.

The general shape in cross-section of the former 1 and of the transformer as a whole comprises a flat side 20 and a flattened rounded side 19. The curvature of the rounded side 19 is that which results directly from the forces applied on the conductors of the winding 2 when a very high current is being carried by said winding. As a result, apart from said inner portion, the former 1 does not need to withstand significant force and may therefore be thin-walled. The turns 21, 21', etc., of the windings 2 outside said inner portion, are merely laid or possibly glued onto the former 1. However, in accordance with the invention, the turns of the winding 2 are fixed mechanically to the former 1 over those portions of the turns which are close to the axis of symmetry 14.

Figure 2:
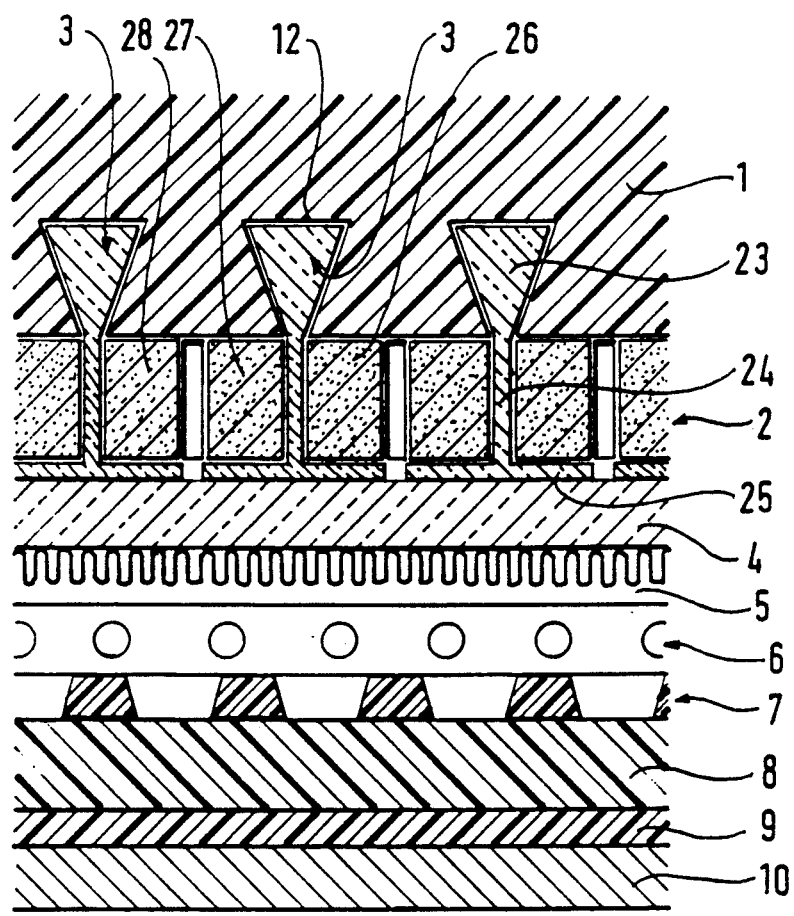
FIG. 2 is a fragmentary cross-section for showing the disposition of the various layers of the inside portion of the FIG. 1 toroidal hybrid transformer in greater detail.

The means for mechanically connecting the turns of the winding 2 to the inner portion of the former 1 which acts as a strength member can be seen more clearly in FIG. 2.

FIG. 2 is a fragmentary cross-section on a larger scale through the toroidal structure taken in a plane referenced 22 in FIG. 1. This figure reproduces items already described with reference to FIG. 1 and not described in greater detail below.

The means fixing the winding 2 to the former 1 are essentially constituted by anchoring wedges 3 each comprising a wedge body 23, a web 24, and at least one supporting flange 25. These anchoring wedges 3 which can also be seen in FIG. 1 constitute single items or groups of items in alignment whose total length is substantially the same as the total axial length of the flat portion 15 of the former wall. Grooves 12 are formed in said portion 15 in order to receive the anchoring wedges 3 and hold them firmly. These grooves and the wedge bodies of the anchoring wedges are triangular in section or dovetailed.

As can be seen in FIG. 2 conductors 26 and 27 constituting turns of the winding 2 disposed in a single layer lie on either side of each web 24. Each conductor is rectangular in section. It is advantageously made of a multifilament material which retains its superconducting properties in the presence of a very intense magnetic field. It is covered with an eletrically insulating layer. It can also be seen that the conductors of two consecutive turns (26, 27) press against opposite faces of the web 24. The same structure is used with each of the anchoring wedges 3. Each anchoring wedge has a supporting flange extending over its two conductors. As a result, each wedge retains its two adjacent conductors 26 and 27 against centripetal forces. The same applies to all of the other anchoring wedges 3. However, it is clear that a single anchoring wedge could be provided per conductor, with each wedge having one flange only, or that a single anchoring wedge could retain a plurality of conductors on one or both sides of its web.

The anchoring wedges may be made of epoxy glass. Each wedge body is put into place by being slid along its groove 12 after the turn 26 has been put into place, after which the turn 27 is pressed against the anchoring wedge 3.

FIG. 2 also shows a duct 11 of rectangular section provided between the turn 27 and the next turn 28, said duct being provided to convey a flow of the same cooling fluid as is to be found inside the former 1. Each duct 11 extends along the entire length of the anchoring wedges to a point where the turns begin to diverge. The cooling liquid flows in a loop along the entire perimeter of the turns, initially through the rectilinear ducts 11, and then along the conductors in the space lying between the former 1 and the inner cold wall 4 of the cryostat.

It may be observed that this fluid circulation as forced by means of a pump, for example, serves to cool the entire height of the winding. The bath provides a supply of fluid that enables a mobile installation to be self-contained without requiring continuous connection to a cryogenic source. However, if such a source is available, the bath of fluid inside the former 1 could be omitted with the forced flow of cooling fluid being obtained from the source.

The layer constituted by the conductors of the winding 2, the webs 24 of the anchoring wedges 3, and the cooling ducts 11 is a compact layer. When an intense current is flowing through the winding, as explained above, the winding is subjected to a uniform centripetal force. The winding itself opposes this force by an arch effect, however the stiffness of this layer is insufficient for that purpose. By having a strength member constituted by the inner portion 15 of the former 1 togather with its reinforcing ribs 16, 17, and 18, mechanically fixed to the winding 2 by the anchoring wedges 3, the required mechanical strength can be achieved.

Outside this inner portion of the winding 2, the turns spread apart from one another and the former 1 may optionally be used for keeping them uniformly spaced apart, e.g. by gluing as mentioned above.

The inner wall 4 is applied over the supporting flanges of the anchoring wedges 3. It may be glued thereto so as to form a unitary support structure anchored to the strength member.

The evacuated space 5 contains a cushion of superinsulation. Such a cushion made of cellular plastic material which is partially aluminum coated, which is very fragile, and which cannot withstand compression forces. The mechanical strength of the inner structure out to the wall 4 ensures that no such forces are applied thereto.

The thermal screen 7 for a flow of liquid nitrogen, and the wedges associated therewith prior to the hot wall of the cryostat is of conventional type.

The same applies to the hot wall 8 of the cryostat, to the insulating layer 9 which reduces the extent to which the wall is heated when impulse heat is dissipated in the secondary winding 10, and finally to the conducting sheet 10 and its binding. It may be observed that the inclusion of a wall 9 is optional.

Naturally, the above description has been given by way of non-limiting example and numerous varients can be devised without going beyond the scope of the invention.

I claim:

1. A toroidal hybrid transformer comprising: a primary winding of conductor turns which is superconducting in operation, a secondary winding which is non-superconducting, thermal and electrical insulation means separating said primary and secondary windings, and a strength member supporting said primary winding for withstanding centripetal forces exerted on the primary winding by electrodynamic force created by electrical current flowing through said primary winding, said strength member supporting the primary winding being disposed inside the conductor turns of said primary winding and comprising means for mechanically coupling the strength member to at least that portion of each conductor turn which lies adjacent to the axis of symmetry of the toroidal transformer, thereby transmitting the centripetal forces exerted of the primary winding to the strength member.

2. A toroidal hybrid transformer according to claim 1, wherein the strength member is constituted by a ring having an outer surface and an outside shape similar to that of the toroidal transformer, the conductor turns of the primary winding being wound around the outer surface of said ring, and a portion of said ring facing the axis of symmetry of said ring including retention means coupling the strength member to at least a corresponding portion of each conductor turn.

3. A toroidal hybrid transformer according to claim 2, wherein said retention means are constituted by anchoring wedges, each comprising: a wedge body inserted in a V-shaped groove in the strength member and retained therein; a connection web extending from the wedge body towards the axis of symmetry of the toroidal hybrid transformer through the thickness of the primary winding; and at least one support flange extending transversely from said web between the primary winding and said axis of symmetry, and receiving the entire centripetal force exerted on the portion of the winding in front of which said flange is located and transmitting said force to the strength member via said web and said wedge body.

4. A toroidal hybrid transformer according to claim 1, wherein said strength member contains a bath of cryogenic cooling liquid such that said primary winding is rendered superconducting.

5. A toroidal hybrid transformer according to claim 1, wherein cooling liquid ducts are included within the primary winding between said retention means for circulating said cryogenic cooling liquid.

6. A toroidal hybrid transformer according to claim 1, wherein the primary winding is covered by layers of electrical and thermal insulation and directly supports the secondary winding, and said secondary winding being insulated and covered by a binding.

7. A toroidal hybrid transformer according to claim 5, wherein the cryogenic cooling liquid is caused to flow in a loop along the entire perimeter of each conductor turn, initially in said ducts which are rectilinear, and then along conductors of the primary winding in a space lying between a cold inner wall and a former on which the transformer primary winding is wound.

* * * * *